United States Patent

[11] 3,628,905

[72] Inventors Helmut Kirschnek;
Dietrich Hildebrand, both of Leverkusen;
Udo-Winfried Hendricks, Cologne Stemmheim; Gerhard Meier, Leverkusen-Rheindorf; Mathieu Quaedvlieg, Opladen, all of Germany
[21] Appl. No. 734,537
[22] Filed June 5, 1968
[45] Patented Dec. 21, 1971
[73] Assignee Farbenfabriken Bayer Aktiengesellschaft Leverkusen, Germany
[32] Priorities June 15, 1967
[33] Germany
[31] F 52695;
Apr. 17, 1968, Germany, No. P 17 69 172.4

[54] PROCESS FOR DYEING OR PRINTING FIBER MATERIALS CONTAINING NH-GROUPS
12 Claims, No Drawings

[52] U.S. Cl..................................................... 8/54,
8/1 B, 8/1 D, 8/1 E, 8/1 L, 8/1 UA, 8/1 T, 8/1 XA, 8/21 A, 8/21 B, 8/88, 8/39, 8/40, 8/163, 8/169, 8/41 B

[51] Int. Cl...................................................... C09b 12/00, D06p 3/14
[50] Field of Search............................................ 8/1.2, 85, 88, 21, 54

[56] References Cited
UNITED STATES PATENTS
3,098,794  7/1963  Dohr et al..................... 260/577 X
3,206,451  9/1965  Benz et al..................... 260/153

Primary Examiner—George F. Lesmes
Assistant Examiner—Patricia C. Ives
Attorney—Plumley, Tyner & Sandt ABSTRACT: Process for dyeing or printing NH-containing fibers with reactive dyestuffs containing at least one group reactive to the NH-group and more than 1 sulfonic acid group comprising adding as surface active compounds aminoxides with at least eight carbon atoms in one and the same radical.

PROCESS FOR DYEING OR PRINTING FIBER MATERIALS CONTAINING NH-GROUPS

The present invention relates to a process for dyeing and printing fiber materials containing NH-groups with dyestuffs which contain at least one group capable of reacting with the fiber materials containing NH-groups and which contain more than one sulfonic acid group. More particularly it concerns a process wherein the dyeing and printing is carried out in the presence of aminoxides which contain at least eight carbon atoms.

Suitable aminoxides are primarily compounds which contain eight to 20 carbon atoms in one and the same hydrocarbon radical. Examples are the following aminoxides with only one aminoxide group:

N,N-dimethyl-N-dodecylaminoxide
N,N-dimethyl-N-hexadecylaminoxide
N,N-dimethyl-N-octadecenyl-aminoxide
N,N-dibutyl-N-dodecylaminoxide
N-methyl-N-cyclohexyl-N-dodecylaminoxide
N,N-dimethyl-N-(dodecanoylamino-methyl)-aminoxide
N,N-diethyl-N-($\beta$-octadecenoylamino-ethyl)-aminoxide
N,N-dimethyl-N-($\alpha$-octadecanoylamino-propyl)-aminoxide
N,N-dimethyl-N-[$\alpha$-(N'-octadecyl-carbaminyl)-aminopropyl]-aminoxide
N,N-dimethyl-N-($\alpha$-octadecyl-sulphonylamino-propyl)-aminoxide
N,N-dimethyl-N-($\alpha$-oleoylamino-propyl)-aminoxide
N-methyl-N,N-bis-[$\alpha$-(octadecanoylamino)-propyl]-aminoxide
N-methyl-N,N-bis-[$\alpha$-(dodecanoylamino)-propyl]-aminoxide
N-methyl-N,N-bis-[$\alpha$-(oleoylamino)-propyl]-aminoxide
N,N-dimethyl-N-($\beta$-octadecyloxy-ethyl)-aminoxide
N-methyl-N-$\beta$-hydroxyethyl-N-[$\alpha$-(octadecanoylamino)-propyl]-aminoxide
N-methyl-N-$\beta$-hydroxyethyl-N[$\alpha$-(oleoylamino)-propyl]-aminoxide
N-methyl-N-[$\alpha$-(octadecanoylamino)-propyl]-N-[$\beta$-(octadecanoyloxy)-ethyl]-aminoxide
N,N-dimethyl-N-[$\beta$-(N'-octadecylcarbaminyl)-hydroxyethyl]-aminoxide
N,N-bis-($\beta$-hydroxyethyl)-N-stearylaminoxide
N-methyl-N-benzyl-N-dodecylaminoxide
N,N-dimethyl-N-(2-oxy-5-tert.butyl-benzyl)-aminoxide
N,N-dimethyl-N-[(2-oxy-naphthyl-1-)-methyl]-aminoxide
N,N-dimethyl-N-(4-dodecyl-phenyl)-aminoxide
N,N-dimethyl-N-(4-dodecanoyl-phenyl)-aminoxide
N-dodecyl-morpholine-N-oxide
N-hexadecyl-morpholine-N-oxide
N-dodecyl-piperidine-N-oxide
N-hexadecyl-piperidine-N-oxide
N-dodecyl-imidazole-N-oxide
N-dodecyl-benzimidazole-N-oxide
N-1-($\beta$-hydroxethyl)-2-octadecyl-imidazoline-N-oxide
1-($\beta$-octadecanoylamino-ethyl)-2-octadecyl-imidazoline-N-oxide.

There may further be mentioned the following aminoxides which contain several aminoxide groups:

N,N-dimethyl-N'-propyl-N'-decyl-ethylene-diamine-N,N'-dioxide
N,N-diethyl-N'-methyl-N'-octadecyl-ethylene-diamine-N,N'-dioxide
N,N,N'-triethyl-N'-dodecyl-ethylene-diamine-N,N'-dioxide
N,N,N'-tripropyl-N'-tetradecyl-ethylene-diamine-N,N'-dioxide
N,N,N'-trimethyl-N'-decyl-1,3-propylene-diamine-N,N'-dioxide
N,N,N'-trimethyl-N'-hexadecyl-1,3-propylene-diamine-N,N'-dioxide    N,N-diethyl-N'-methyl-N'-dodecyl-1,3-propylene-diamine-N,N'-dioxide
N,N,N'-tris-($\beta$-hydroxyethyl)-N'-octadecyl-1,3-propylene-diamine-N,N'-dioxide
N,N,N',N'-tetramethyl-aminoundecylamine-N,N'-dioxide
N,N,N',N'-tetramethyl-aminomethyl-stearylamine-N,N'-dioxide
2,5-dihydroxy-1,4-bis-(dimethylaminomethyl)-benzene-N,N'-dioxide
2,2-bis-[4'-hydroxy-3'-(dimethylaminoxide-methyl)-phenyl]-propane
Adipic acid-di-($\beta$-1-oxide-imidazoline-1-yl-ethyl)-ester, and, moreover, the aminoxides which are obtained when in high-molecular compounds containing several tertiary amino groups—e.g. in condensation products obtained from N-$\beta$-hydroxyethyl-N-$\alpha$-aminopropyl-N-methylamine or bis-($\alpha$-aminopropyl)-methyl-amine and adipic acid or sebacic acid or their esters; in copolymers obtained from 2-vinyl-pyridine and ethylene, propylene or dodecyl acrylate; in polyureas obtained from bis-($\alpha$-aminopropyl)-methylamine and hexamethylene diisocyanate or toluidene diisocyanate; in polyurethanes obtained from bis-($\beta$-hydroxyethyl)-methylamine or N-$\beta$-hydroxyethyl-N-$\alpha$-aminopropyl-N-methylamine and hexamethylene diisocyanate or toluidine diisocyanate; in reaction products of $\alpha$, $\beta$-unsaturated carboxylic acids, such as acrylic acid, methacrylic acid, crotonic acid and maleic acid or their esters, with bis-($\alpha$-aminopropyl)-methylamine; and in reaction products of epoxides, such as epichlorohydrin, butylene dioxide and diglycidyl-ethylene glycol ether, with bis-($\alpha$-aminopropyl)-methylamine—the tertiary amino groups are completely converted into aminoxide groups in known manner by means of hydrogen peroxide.

Furthermore, there may also be used those aminoxides which contain polyglycol ether groups, in addition to one aminoxide group or several aminoxide groups. Examples are the following compounds:

1-(dimethylamino-N-oxide)-3,6,9-trioxa-11-(4'-nonylphenoxy)-undecane
1-(dimethylamino-N-oxide)-2-hydroxy-4-hexadecane
1-(dimethylamino-N-oxide)-3,6,9-trioxa-heneicosane
1-(dimethylamino-N-oxide)-4,7,10,13,16-penta-oxa-19-thiahentriacontane N-monoxides of the reaction products of 3–200 moles ethylene oxide with 1 mole stearylamine, and N,N'-dioxides of the reaction products of 5–200 moles ethylene oxide with 1 mole 9-aminostearylamine or 9-(aminomethyl)-stearylamine.

Finally, those aminoxides which contain a basic nitrogen atom or several basic nitrogen atoms, in addition to one aminoxide group or several aminoxide groups, are also suitable for the process of the present invention. Examples are the following compounds:

N-methyl-N-octadecyl-N-[3-(di-p-hydroxyethylamino)-propyl]-aminoxide
N-methyl-N-octadecyl-N-(3-dimethylamino)-propyl-aminoxide
N-methyl-N-octadecyl-N-[3-($\alpha$-aminopropylamino)-propyl]-aminoxide, and those aminoxides which are obtained when in the above-mentioned compounds containing several tertiary amino groups, e.g. condensation products, copolymers, polyureas, polyurethanes, conversion products and reaction products, only part of the tertiary amino groups is converted into aminoxide groups.

The aminoxides to be used according to the invention are obtainable in a manner known as such by oxidation of the corresponding tertiary amines preferably with hydrogen peroxide or peracids (see Houben-Weyl "Methoden der organischen Chemie," vol. XI/2, p. 192–200, 4th edition, 1958).

The necessary amounts of aminoxides can easily be established in every case by preliminary experiments; in general, amounts of 0.2–3 percent, referred to the weight of the fiber materials containing NH-groups, which are to be dyed or printed, will prove sufficient.

It has often proved to be of advantage, for example if precipitations occur to use, in addition to the aminoxides, also dispersing agents, expediently those of a nonionic type, such as e.g. the reaction products of 6–200 moles ethylene oxide with 1 mole fatty alcohol, fatty acid or fatty acid amide and the reaction products of such polyglycol ethers with alkylating or acylating agents, such as dimethyl or diethyl sulfate or acetic acid or methyl isocyanate. Also in these cases, the expedient amounts of dispersing agents can easily be established by preliminary experiments; in general, amounts of about 20–100 parts by weight per 100 parts by weight aminoxide will suffice.

Fiber materials containing NH-groups, which are suitable for the process according to the invention are, in the first instance, wool, silk and those synthetic fiber materials which are based on poly-ε-caprolactam, polyheramethylene-diamine adipate or ω-amino-undecanic acid. The fibers containing NH-groups may be present in mixture with other fibers, for example, in mixture with fibers of natural or regenerated cellulose, cellulose triacetate, polyacrylonitrile, polyurethanes, polyesters obtained form terephthalic acid and ethylene glycol, or polyesters obtained from terephthalic acid and 1,4-bis-hydroxymethyl-cyclohexane.

Numerous dyestuffs are known, which contain at least one group capable of reacting with the fiber materials containing NH-groups and contain more than one sulfonic acid group; suitable groups which are capable of reacting with fiber materials containing NH-groups are, for example:
halotriazine, such as fluoro-, chloro- or bromo-triazine, halopyrimidine, such as fluoro-, chloro- or bromo-pyrimidine, haloquinoxaline-carbonyl, halophthalazine-carbonyl, vinylsulfone β-hydroxyethyl-sulfone ester, methylsulfonyl-triazine, methylsulfonyl-pyrimidine, methysulfonyl-benzothiazole, fluorobenzothiazole, β-hydroxyethyl-sulfonamide ester, β-hydroxy-ethyl-sulfon-alkylamino ester, α-bromoacrylorl, β-chloropropionyl, β-chloroacetyl, β-phenylsulfonylpropionyl, halopyridazone alkyl, 2-chlorobenzothiazole sulfonyl alkylsulfonyl-pyrimidine, ammonium triazine and acryloyl groups or groups which can be converted into these groups.

Reference be made in this context to the following publications in which dyestuffs are described, which contain at least one group capable of reacting with fiber materials containing NH-groups and contain more than one sulfonic acid group:
Angewandte Chemie 1961, pages 125–136; 1964, pages 423–431; American Dyestuff Reporter 1961, pages 505–515; British Pat. Specifications Nos. 733–471, 916,094, 902,618, 1,002,648, 1,000,801, 1,067,876, 797,946, 798,121, 822,047, 837,750, 887,588, 995,791 and 989,192; French Pat. Specification Nos. 1,427,781 and 1,466,567; Swiss Pat. Specification No. 364,062; and U.S. Pat. Specification No. 2,657,205. The classes of dyestuffs illustrated are reactive dyestuffs where the chromophore therein includes vat dyestuffs, acid dyestuffs, water soluble or insoluble dyestuffs especially azo and metallized azo dyestuffs (including mono and poly azo dyestuffs); nitro; triphenylmethane; azaporphin especially phthalocyanines, metallized phthalocyanines; azomethine; benzanthrone; dibenzanthrone; polycyclic condensation products of dibenzanthrone; polynuclear quinones especially anthraquinones; oxazine, dioxazine.

The dyeing or printing of the fiber materials containing NH-groups with the dyestuffs concerned in the presence of the aminoxides is expediently carried out in a weakly acidic bath or with weakly acidic printing pastes under the conditions of temperature usually applied for reactive dyestuffs.

With the aid of the process according to the invention it is possible to achieve dyeings or prints of outstanding levelness and a high degree of fixation on fiber materials containing NH-groups. This is also true when differences in the affinity to the dyestuff used exist in the fiber material, as is the case, for example, with wool fibers. Level dyeings are also obtained with mixtures of dyestuffs which exhibit substantial differences with regard to their reactivity to the fiber material. Even the reactive dyestuffs of the phthalocyanine series, which contain, on average, 1–2 sulfonic acid groups per molecule and have hitherto been difficult to level, yield uniform dyeings in the process according to the invention.

It is known that the dyeing or printing of fiber materials containing NH-groups with dyestuffs which contain at least one group capable of reacting with the fiber material and contain more than one sulfonic acid group, encounters substantial difficulties. The auxiliaries which have hitherto been proposed for overcoming these difficulties do not exhibit the advantageous effects described above to the same extent.

The parts given in the following examples are parts by weight; the constitutions of the dyestuffs characterized by (I) to (XIV) are illustrated in the survey at the end of the examples.

EXAMPLE 1

One hundred parts of loose wool tending to yield tippy dyeings are introduced at 40° C. into a dyebath which is composed as follows:
5000 parts of water
  3 parts of 60 percent acetic acid
  5 parts of anhydrous sodium sulfate
  0.5 parts of the reaction product of 19 moles ethylene oxide with 1 mole oleyl alcohol
  1.2 parts of the 50 percent aqueous solution of a high-molecular aminoxide described below
  2 parts of a mixture of equal parts of the dyestuffs (I) and (V).

The dyebath is brought to the boil within 45 minutes and held at this temperature for 75 minutes. The loose wool is subsequently withdrawn from the bath, rinsed in the usual manner with water and dried. A level violet dyeing is obtained.

The 50 percent aqueous solution of the high-molecular aminoxide used above was prepared in the following manner:

A mixture of 174 parts adipic acid methyl ester and 143 parts N-bis-(α-aminopropyl)-methylamine is heated with stirring at 170°–180′ C. for 1½ hours, subsequently cooled to 130° C., then mixed with 15 parts acetic acid anhydride and stirred at 130° C. for a further 30 minutes. One hundred parts of the polyamide so obtained are dissolved in 100 parts ethanol, mixed with 150 parts of 30 percent hydrogen peroxide and heated at 50°–60° C. for 5 hours. The bulk of the excess hydrogen peroxide is then destroyed by introducing a platinum sheet, and the residual amount by the dropwise addition of a 25 percent solution of sodium platinum sheet, and the residual amount by the dropwise addition of a 25 percent solution of sodium sulfite. The precipitated sodium sulfate is filtered off, the filtrate is concentrated by evaporation, and the residue mixed with a sufficient amount of water that the solids content of the resultant aqueous solution amounts to 50 percent.

EXAMPLE 2

The procedure is as described in example 1, but with the use of a dyebath which contains, instead of 1.2 parts of the stated 50 percent aqueous solution of the high-molecular aminoxide and the stated dyestuff mixture, 0.8 parts of the aminoxide of the formula

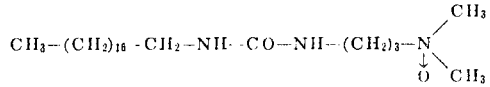

and 2.1 parts of a mixture of equal parts of the dyestuffs (I), (III) and (IV). A level brown dyeing is obtained.

EXAMPLE 3

The procedure is as described in example 1, but with the use of a dyebath which contains, instead of 1.2 parts of the stated 50 percent aqueous solution of the high-molecular aminoxide and the stated dyestuff mixture, 1.25 parts of the aminoxide of the formula

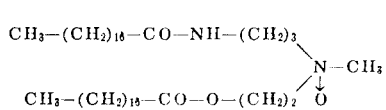

and 2 parts of a mixture of equal parts of the dyestuffs (III) and (IV). A level vivid green dyeing is obtained.

EXAMPLE 4

The procedure is as described in example 1, but with the use of a dyebath which contains, instead of the stated 50 percent aqueous solution of the high-molecular aminoxide and the stated dyestuff mixture, 1.1 parts of the aminoxide of the formula

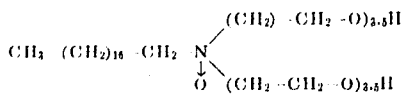

and 2.1 parts of a mixture of equal parts of the dyestuffs (I), (III) and (V). A level brown dyeing is obtained.

EXAMPLE 5

One hundred parts of woolen knitting yarn are introduced at 40° C. into a dyebath which is composed as follows:
4000 parts of water
   3 parts of 60 percent acetic acid
   5 parts of anhydrous sodium sulfate
   0.25 parts of the reaction product of 19 moles ethylene oxide with 1 mole oleyl alcohol,
   0.25 parts of the aminoxide of the formula

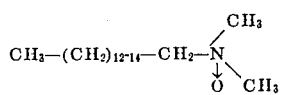

parts of the dyestuff (III).

The dyebath is heated to boiling temperature within 45 minutes and held at this temperature for 60 minutes. The knitting yarn is subsequently rinsed and dried in the usual manner. A level yellow dyeing is obtained.

A level yellow dyeing is also obtained by using a dyebath which contains, instead of 0.25 parts of the stated aminoxide, 0.35 parts of the aminoxide of the formula

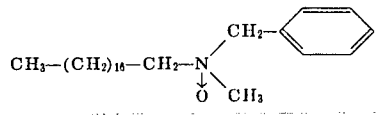

or 0.35 parts of the aminoxide of the formula

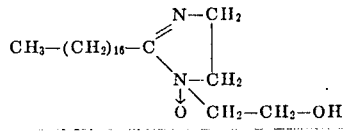

EXAMPLE 6

The procedure is as described in example 5, but with the use of a dyebath which contains, instead of 0.25 parts of the stated aminoxide and 2 parts of the dyestuff (III), 0.2 parts of the aminoxide of the formula

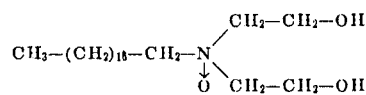

and 2 parts of the dyestuff (I). A vivid level red dyeing is obtained.

EXAMPLE 7

The procedure is as described in example 5, but with the use of a dyebath which contains, instead of 0.25 parts of the stated aminoxide and 2 parts of the dyestuff (III), 0.2 parts of the aminoxide of the formula

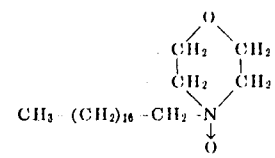

and 2 parts of the dyestuff (VII). A level red dyeing is obtained.

EXAMPLE 8

The procedure is as described in example 5, but with the use of a dyebath which contains, instead of 0.25 parts of the stated aminoxide and 2 parts of the dyestuff (III), 0.3 parts of the aminoxide of the formula

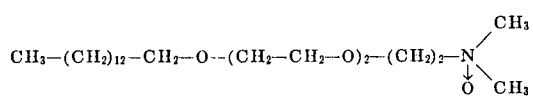

and 2 parts of a mixture of equal parts of the dyestuffs (I) and (III). A level orange dyeing is obtained.

EXAMPLE 9

The procedure is as described in example 5, but with the use of a dyebath which contains, instead of 0.25 parts of the stated aminoxide and 2 parts of the dyestuff (III), 0.25 parts of the aminoxide of the formula

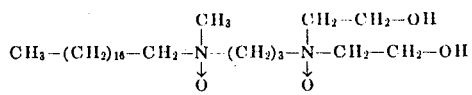

and 2 parts of the dyestuff (II). A vivid level blue dyeing is obtained.

EXAMPLE 10

One hundred parts of wool fabric are introduced at 40° C. into a dyebath which is composed as follows:
5000 parts of water
   3 parts of 60 percent acetic acid
   5 parts of anhydrous sodium sulfate
   0.5 parts of the reaction product of 19 moles ethylene oxide with 1 mole oleyl alcohol
   0.4 parts of the aminoxide of the formula

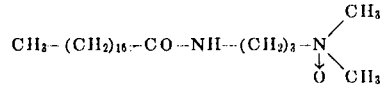

2 parts of the dyestuff (IV).

The dyebath is heated to 80° C. within 30 minutes, held at this temperature for 30 minutes, then heated to boiling temperature and held at this temperature for 30 minutes. The wool fabric is subsequently rinsed and dried in the usual manner. A level turquoise dyeing is obtained.

EXAMPLE 11

The procedure is as described in example 10, but with the use of a dyebath which contains, instead of 0.4 parts of the stated aminoxide and 2 parts of the dyestuff (IV), 0.65 parts of the aminoxide of the formula $$CH_3(CH_2)_{16}-CO-NH-(CH_2)_3 \diagdown N-CH_3 \diagup \\ CH_3(CH_2)_{16}-CO-NH-(CH_2)_3 \diagup \downarrow O$$

and 2 parts of the dyestuff (II). A vivid level blue dyeing is obtained.

EXAMPLE 12

The procedure is as described in example 10, but with the use of a dyebath which contains, instead of 0.5 parts of the reaction product of 19 moles ethylene oxide with 1 mole oleyl alcohol, 0.75 parts of this product and, instead of 0.4 parts of the stated aminoxide and 2 parts of the dyestuff (IV), 0.35 parts of the aminoxide of the formula $$CH_3-(CH_2)_{12}-CH_2-NH-CO-NH-(CH_2)_3-N \diagup CH_3 \diagdown \downarrow O \diagdown CH_3$$

and 2 parts of a mixture of 1 part of the dyestuff (VI) and 3 parts of the dyestuff (II). A level dark-blue dyeing is obtained.

EXAMPLE 13

One hundred parts of a wool top yarn wound on cheeses are introduced at 40° C. into a dyebath which is composed as follows:
2000 parts of water
  3 parts of 60 percent acetic acid
  5 parts of anhydrous sodium sulfate
  1.5 parts of the aminoxide of the formula $$CH_3-(CH_2)_{15}-CH_2-N \diagup (CH_2-CH_2-O)_{14}-CH_2-CH_2-OH \diagdown \downarrow O \diagdown (CH_2-CH_2-O)_{14}-CH_2-CH_2-OH$$

2 parts of the dyestuff (VI).
The dyebath is heated to 106° C. within 30 minutes and held at this temperature for 30 minutes. The wool top yarn is subsequently rinsed and dried in the usual manner. A level Bordeaux dyeing is obtained.

EXAMPLE 14

One hundred parts of a knitted fabric made of polyamide based on polyhexamethylene-diamine adipate are introduced into a dyebath which is composed as follows:
4000 parts of water
  2 parts of 60 percent acetic acid
  0.5 parts of the reaction product of 19 moles ethylene oxide with 1 mole oleyl alcohol
  0.35 parts of the aminoxide of the formula $$CH_3-(CH_2)_{16}-CH_2-O-(CH_2)_3-N \diagup CH_3 \diagdown \downarrow O \diagdown CH_3$$

2 parts of the dyestuff (VI).
The dyebath is heated to boiling temperature within 45 minutes and held at this temperature for 60 minutes. The knitted fabric is subsequently rinsed and dried in the usual manner. A level Bordeaux dyeing is obtained.

EXAMPLE 15

One hundred parts of yarn of natural silk are introduced at 40° C. into a dyebath which is composed as follows:
3000 parts of water
  2.5 parts of 60 percent acetic acid
  0.5 parts of the reaction product of 19 moles ethylene oxide with 1 mole oleyl alcohol 0.4 parts of the aminoxide of the formula $$CH_3-(CH_2)_{13}-CH_2-SO_2-NH-(CH_2)_3-N \diagup CH_3 \diagdown \downarrow O \diagdown CH_3$$

2 parts of the dyestuff (II).
The dyebath is heated to 95° C. within 45 minutes and held at this temperature for 60 minutes. The yarn is subsequently rinsed and dried in the usual manner. A level blue dyeing is obtained.

EXAMPLE 16

Woolen combed material is printed according to the Vigoureux printing process with a paste which is composed as follows:
  20 parts of the dyestuff (I)
  60 parts urea
  5 parts of the reaction product of 19 moles ethylene oxide with 1 mole oleyl alcohol
  10 parts of the aminoxide of the formula $$CH_3-(CH_2)_6-CH_2-CO-NH-(CH_2)_3 \diagdown N \diagup CH_3 \\ CH_3-(CH_2)_6-CH_2-CO-NH-(CH_2)_3 \diagup \downarrow O$$

15 parts of 60 percent acetic acid
  8 parts of a thickening agent based on carob bean flour 882 parts of water.
After printing, the combed material is steamed at 100° C. for 1 hour, then rinsed with cold and hot water and finished in the usual manner. A level red print is obtained.

EXAMPLE 17

One hundred parts of loose wool tending to yield tippy dyeings are introduced at 40° C. into a dyebath which is composed as follows:
4000 parts of water
  3 parts of 60 percent acetic acid
  5 parts of anhydrous sodium sulfate
  0.5 parts of an aminoxide of the formula $$CH_3(CH_2)_{10}-CO-NH-(CH_2)_3 \diagdown N-CH_3 \\ CH_3(CH_2)_{10}-CO-NH-(CH_2)_3 \diagup \downarrow O$$

2 parts of the dyestuff (VIII).
The dyebath is brought to the boil within 45 minutes and held at this temperature for 60 minutes. The loose wool is subsequently withdrawn from the bath, rinsed in the usual manner with water and dried. A level yellow dyeing is obtained.

EXAMPLE 18

One hundred parts of woolen combed material are introduced at 40° C. into a dyebath which is composed as follows:
4000 parts of water
  3 parts of 60 percent acetic acid
  5 parts of anhydrous sodium sulfate
  0.5 parts of the reaction product of 19 moles ethylene oxide with 1 mole oleyl alcohol
  0.5 parts of the aminoxide of the formula $$CH_3-(CH_2)_7-CH=CH-(CH_2)_7-CO-NH-(CH_2)_3-N \diagup CH_3 \diagdown \downarrow O \diagdown CH_3$$

2 parts of the dyestuff (IX).

The dyebath is heated to boiling temperature within 45 minutes and held at this temperature for 60 minutes. The combed material is subsequently withdrawn from the bath rinsed in the usual manner and dried. A level blue dyeing with neutral shade is obtained.

EXAMPLE 19

One hundred parts of woolen knitting yarn are introduced at 40° C. into a dyebath which is composed as follows:
4000 parts of water
  3 parts of 60 percent acetic acid
  5 parts of anhydrous sodium sulfate
  0.25 parts of the reaction product of 19 moles ethylene oxide with 1 mole oleyl alcohol
  0.25 parts of the aminoxide of the formula

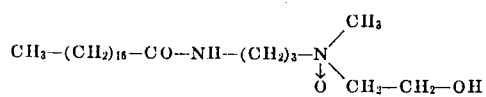

2 parts of the dyestuff (X).

The dyebath is heated to 70° C., held at this temperature for 45 minutes and then heated to boiling temperature and held at this temperature for 15 minutes. The knitting yarn is subsequently rinsed and dried in the usual manner. A level orange dyeing is obtained.

EXAMPLE 20

The procedure is as described in example 19 but with the use of a dyebath which contains, instead of the one part of the dyestuff (X), two parts of the dyestuff (XI). A level red dyeing is obtained.

EXAMPLE 21

One hundred parts of a wool top yarn wound on cheeses are introduced at 40° C. into a dyebath which is composed as follows:
2000 parts of water
  3 parts of 60 percent acetic acid
  5 parts of anhydrous sodium sulfate
  0.5 parts of the reaction product of 19 moles ethylene oxide with 1 mole oleyl alcohol
  0.25 parts of the aminoxide of the formula

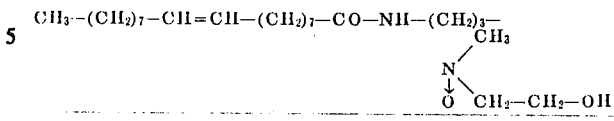

2 parts of the dyestuff (XII).

The dyebath is heated to the boil within 45 minutes and held at this temperature for 60 minutes. The wool top yarn is subsequently rinsed and dried in the usual manner. A level ruby red dyeing is obtained.

EXAMPLE 22

One hundred parts of a woolen knitted fabric are introduced at 40° C. into a dyebath which is composed as follows:
5000 parts of water
  3 parts of 60 percent acetic acid
  5 parts of anhydrous sodium sulfate
  0.5 parts of the reaction product of 19 moles ethylene oxide with 1 mole oleyl alcohol
  0.5 parts of the aminoxide of the formula

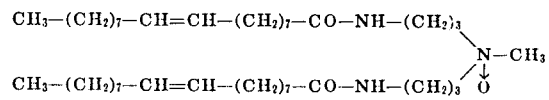

2 parts of the dyestuff (XIII).

The dyebath is heated to the boil within 45 minutes and held at this temperature for 60 minutes. The wool fabric is subsequently rinsed and dried in the usual manner. A level greenish blue dyeing is obtained.

EXAMPLE 23

When dyeing 100 parts of a wool fabric in the same manner as described in example 22, replacing however dyestuff (XIII) by dyestuff (XIV), a level red dyeing is obtained.

Survey of the dyestuffs used in the examples

| Dyestuff | Constitution |
|---|---|
| (IV) | [Cu-phthalocyanine] with (SO₃Na)₂.₅ and (SO₂—NH—C₆H₃(SO₃Na)—NH—OC—quinoxaline-2,3-Cl₂)₁.₅ |
| (V) | [Cu-phthalocyanine] with (SO₃Na)₁.₅, (SO₂NH₂)₀.₇₅, and (SO₂—NH—O₂S—quinoxaline-2,3-Cl₂)₁.₇₅ |
| (VI) | cobalt(1:2)-complex of hydroxyphenyl-azo-hydroxynaphthyl dye with SO₂NH—CH₂—CH₂—NH—CO—CH₂Cl and CH₂—NH—CO—CH₂Cl substituents |
| (VII) | Sulfonated phenyl-azo-naphthol with HN-(5-chloro-2,4-difluoropyrimidinyl) group |
| (VIII) | Pyrazolone dye with NaO₃S-phenyl-azo, CH₃, HO, 2,5-dichloro-4-sulfophenyl, and NH-(5-chloro-2-fluoropyrimidin-4-yl) groups |
| (IX) | 1-amino-4-[4-(5-chloro-2-fluoropyrimidin-4-ylamino)phenylamino]anthraquinone-2,7-disulfonic acid disodium salt |
| (X) | 8-amino-1-[4-(5-chloro-2-fluoropyrimidin-4-ylamino)phenylazo]naphthalene-3,6-disulfonic acid disodium salt |
| (XI) | 1-hydroxy-2-methylamino-naphthalene-6-sulfonate coupled via azo to phenyl bearing SO₃Na and NH-(5-chloro-2-fluoropyrimidin-4-yl) |

| Dyestuff | Constitution |
|---|---|
| (XII) | 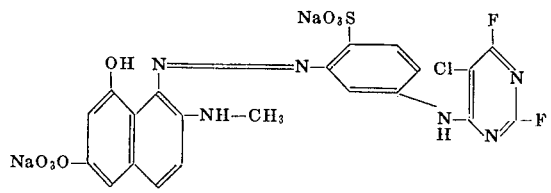 |
| (XIII) | 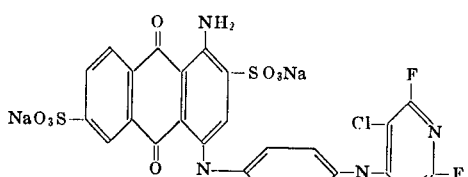 |
| (XIV) | 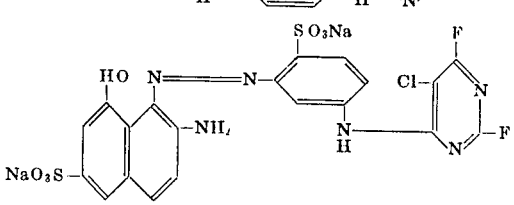 |

We claim:
1. A process for dyeing or printing fibers containing NH-groups comprising applying to said fibers, dyestuffs containing at least one group capable of reacting with fiber materials containing NH-groups and containing more than one sulfonic acid group, and an aminoxide which contains at least eight carbon atoms.
2. Process according to claim 1 wherein nonionic dispersing agents are also used.
3. Process according to claim 2, wherein that as nonionic dispersing agents are used the ethoxylation products of fatty alcohols, fatty acids or fatty acid amides respectively, their alkylation or acylation products.
4. The process according to claim 2 wherein the nonionic dispersing agents are selected from the group consisting of the ethoxylation products of fatty alcohols, fatty acids or fatty amides and their alkylation or acylation products.
5. The process according to claim 1 wherein the aminoxides are present in a quantity of 0.2 to 3 percent based on the weight of the fiber materials.
6. Process according to claim 1 wherein the aminoxides contain eight to 20 carbon atoms in one and the same hydrocarbon radical.
7. Process according to claim 6, wherein the $C_8$—$C_{20}$—hydrocarbon radical is a $C_8$—$C_{20}$—alkyl or $C_8$—$C_{20}$—alkenyl radical.
8. Process according to claim 7 wherein the aminoxides containing a $C_8$—$C_{20}$—alkyl radical are aminoxides of the formula

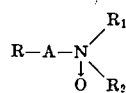

wherein R denotes a $C_8$—$C_{18}$—alkyl or $C_8$—$C_{18}$—alkenyl radical;
A is a direct C—N—bond or a member selected from the group consisting of —NH—CONH—$(CH_2)_3$—, —CONH—$(CH_2)_3$—, —$SO_2NH$—$(CH_2)_3$—, —O—$(CH_2)_3$—, and —O—$(CH_2CH_2O)_2$—$CH_2CH_2$—;
$R_1$ stands for —$CH_3$, —$CH_2CH_2$—OH, —$(CH_2CH_2O)_{3.5}H$, or —$(CH_2CH_2O)_{14}$—$CH_2CH_2$—OH; and
$R_2$ denotes —A—R, —$(CH_2)_2$—OOC—$(CH_2)_{16}$—$CH_3$, methyl, β-hydroxyethyl, —$(CH_2CH_2O)_{3.5}H$, —$(CH_2CH_2O)_{14}$—$CH_2CH_2OH$, benzyl,

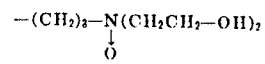

or together with $R_1$ forms a morpholine ring.
9. Process according to claim 8 wherein
A is a direct C—N—bond, —NH—CONH—$(CH_2)_3$— or —CONH—$(CH_2)_3$—.
10. Process according to claim 8
R denotes a $C_{14}$—$C_{18}$—alkyl radical;
A is a direct C—N—bond;
$R_1$ denotes methyl, β-hydroxyethyl, —$(CH_2CH_2O)_{3.5}H$ or —$(CH_2CH_2O)_{14}$—$CH_2CH_2OH$; and
$R_2$ is methyl, β-hydroxyethyl, —$(CH_2CH_2O)_{3.5}H$, —$(CH_2CH_2O)_{14}$—$CH_2CH_2OH$, benzyl,

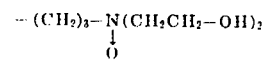

or forms together with $R_1$ a morpholine ring.
11. Process according to claim 8 wherein
R denotes a $C_8$—$C_{17}$alkyl or $C_{18}$—alkenyl radical;
A is —CONH—$(CH_2)_3$—;
$R_1$ is methyl; and
$R_2$ is —A—R, —$(CH_2)_2$—OOC—$(CH_2)_{16}$—$CH_3$, methyl or β-hydroxyethyl.
12. Process according to claim 8 wherein
R denotes a $C_{14}$—$C_{18}$—alkyl radical;
A is —NH—CONH—$(CH_2)_3$—; and
$R_1$ and $R_2$ are methyl.

* * * * *

UNITED STATES PATENT OFFICE
CERTIFICATE OF CORRECTION

Patent No. 3,628,905　　　　　　　　　Dated December 21, 1971

Inventor(s) Helmut Kirschnek, et al.

It is certified that error appears in the above-identified patent and that said Letters Patent are hereby corrected as shown below:

| Column | Line | Error |
|---|---|---|
| 1 | 22 | "$\alpha$" should be --- $\gamma$ ---. |
| 1 | 23 | "$\alpha$" should be --- $\gamma$ ---. |
| 1 | 25 | "$\alpha$" should be --- $\gamma$ ---. |
| 1 | 27 | "$\alpha$" should be --- $\gamma$ ---. |
| 1 | 28 | "$\gamma$" should be --- $\gamma$ ---. |
| 1 | 30 | "$\alpha$" should be --- $\gamma$ ---. |
| 1 | 32 | "$\alpha$" should be --- $\gamma$ ---. |
| 1 | 34 | "$\alpha$" should be --- $\gamma$ ---. |
| 1 | 36 | "$\alpha$" should be --- $\gamma$ ---. |
| 1 | 38 | "$\alpha$" should be --- $\gamma$ ---. |
| 2 | 9 | "$\alpha$" should be --- $\gamma$ --- (both occurrences). |
| 2 | 13 | "$\alpha$" should be --- $\gamma$ ---. |
| 2 | 16 | "$\alpha$" should be --- $\gamma$ ---. |
| 2 | 20 | "$\gamma$" should be --- $\gamma$ ---. |
| 2 | 22 | "$\alpha$" should be --- $\gamma$ ---. |
| 2 | 50 | "$\alpha$" should be --- $\gamma$ ---. |

UNITED STATES PATENT OFFICE
CERTIFICATE OF CORRECTION

Patent No. 3,628,905          Dated December 21, 1971

Inventor(s) Helmut Kirschnek, et al.

It is certified that error appears in the above-identified patent and that said Letters Patent are hereby corrected as shown below:

| Column | Line | Error |
|---|---|---|
| 2 | 45 | "(di-p-" should be ---(di-$\beta$---. |
| 3 | 8 | "polyheramethylene-" should be ---polyhexamethylene- ---. |
| 3 | 13 | "form" should be ---from---. |
| 3 | 27 | "$\alpha$-bromoacrylorl" should be ---$\alpha$-bromoacryloyl---. |
| 3 | 39 | "733-471" should be ---733,471--- |
| 4 | 29 | "$\alpha$" should be ---$\gamma$---. |
| 4 | 30 | "170°-180'" should be ---170°-180°---. |
| 4 | 38 | "platinum sheet, and the residual amount by the dropwise addition of a 25% solution of sodium" should be deleted. |
| 5 | Ex 4 in the formula | "$N\diagup^{(CH_2)-CH_2-O)_{3.5}H}_{\diagdown}$" should be ---$N\diagup^{(CH_2-CH_2-O)_{3.5}H}_{\diagdown}$---. |

-2-

FORM PO-1050 (10-69)      USCOMM-DC 60376-P69

UNITED STATES PATENT OFFICE
CERTIFICATE OF CORRECTION

Patent No. 3,628,905            Dated December 21, 1971

Inventor(s) Helmut Kirschnek, et al.

It is certified that error appears in the above-identified patent and that said Letters Patent are hereby corrected as shown below:

| Column | Line | Error |
|---|---|---|
| 5 | 37 | Before the first word in the sentence "parts", insert the number ---2---. |
| 7 | 1st formula | Insert hyphens (-) to read $CH_3(CH_2)_{16}-CO-NH-(CH_2)_3$ \ $N-CH_3$ / $CH_3(CH_2)_{16}-CO-NH-(CH_2)_3$ ↓ O |
| 11 | formula (VII) | "NaO$_3$S" should be ---SO$_3$Na---. |
| 11 | formula (X) | "NaO$_3$" should be ---NaO$_3$S---. |
| 13 | formula (XII) | "NaO$_3$O" should be ---NaO$_3$S---. |
| 13 | formula (XII) | "[structure with NaO$_3$S, F, Cl, N-H, N]" should be |

-3-

UNITED STATES PATENT OFFICE
CERTIFICATE OF CORRECTION

Patent No. 3,628,905     Dated December 21, 1971

Inventor(s) Helmut Kirschnek, et al.

It is certified that error appears in the above-identified patent and that said Letters Patent are hereby corrected as shown below:

| Column | Line | Error |
|---|---|---|
| | | 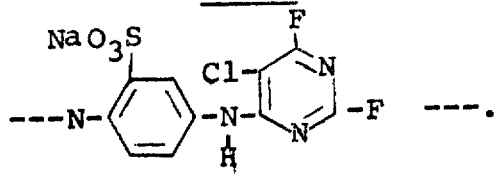 |
| 13 | Claim 8 | In the definition of $R_1$, "-$(CH_2CH_2O)_{3.5}H$," should be --- -$(CH_2CH_2O)_{3.5}H$,---; in the definition of $R_2$, "-$(CH_2CH_2O)_{3.5}H$" should be --- -$(CH_2CH_2O)_{3.5}H$---. |
| 14 | Claim 10 | In the definition of $R_1$, "-$(CH_2CH_2O)_{3.5}H$," should be --- -$(CH_2CH_2O)_{3.5}H$,---; In the definition of $R_2$, "-$(CH_2CH_2O)_{3.5}H$" should be --- -$(CH_2CH_2O)_{3.5}H$---. |
| 13 | Claim 3 | "Process according to ... that as ..." should be ---Process according to ... as ...---. |

Signed and sealed this 8th day of October 1974.

(SEAL)
Attest:

McCOY M. GIBSON JR.
Attesting Officer

C. MARSHALL DANN
Commissioner of Patents